United States Patent [19]
Kimura

[11] Patent Number: 5,767,863
[45] Date of Patent: Jun. 16, 1998

[54] VIDEO PROCESSING TECHNIQUE USING MULTI-BUFFER VIDEO MEMORY

[75] Inventor: Scott A. Kimura, Saratoga, Calif.

[73] Assignee: AuraVision Corporation, Fremont, Calif.

[21] Appl. No.: 706,752

[22] Filed: Sep. 3, 1996

Related U.S. Application Data

[63] Continuation of Ser. No. 142,623, Oct. 22, 1993, Pat. No. 5,568,165.

[51] Int. Cl.[6] ........................................ G09G 5/00
[52] U.S. Cl. ........................ 345/507; 345/516; 345/508
[58] Field of Search ................................ 345/202, 185, 345/201, 200, 203, 197, 198, 507, 508, 516; 348/439, 459, 452, 514

[56] References Cited

U.S. PATENT DOCUMENTS

| | | | |
|---|---|---|---|
| 4,468,708 | 8/1984 | Coleman, Jr. | 358/310 |
| 4,523,227 | 6/1985 | Hurst | 358/105 |
| 4,816,815 | 3/1989 | Yoshiba | 340/750 |
| 4,862,269 | 8/1989 | Sonoda et al. | 358/160 |

*Primary Examiner*—Xiao Wu
*Attorney, Agent, or Firm*—Skjerven, Morrill, MacPherson, Franklin & Friel LLP; Brian D. Ogonowsky; Tom Chen

[57] ABSTRACT

In a preferred embodiment, when full-motion video data is to be captured on a hard disk, a full-motion video memory on a video controller card has its addresses segmented into four groups, where each group can store one scaled-down frame (or field) of video data. The video memory is arranged to effectively act as a four-frame, first-in first-out (FIFO) buffer. The holding time of a single frame of data (i.e., four times the conventional holding time) in the video memory is sufficient to allow for the unpredictable variations in the hard drive timing so that frames are not arbitrarily dropped by worst case timing/accessing times of the hard drive. Hence, the average bandwidth and timing of the hard drive, rather than the instantaneous worst case bandwidth and timing of the hard drive, is used when designing the system. Additionally, video data may be read from and written into the same frame area in the video memory as long as the read (capture) and write (video-in) pointers have been determined to not overlap while accessing the same frame area. This more efficiently utilizes the capabilities of the hard drive.

10 Claims, 4 Drawing Sheets

VIDEO PROCESSING TECHNIQUE USING MULTI-BUFFER VIDEO MEMORY

This application is a continuation of application ser. No. 08/142,623, filed Oct. 22, 1993, now U.S. Pat. No. 5,568,165

CROSS-REFERENCE TO RELATED APPLICATIONS

This application is related to U.S. application Ser. No. 08/127,219, filed Sep. 27, 1993, now U.S. Pat. No. 5,442,747, entitled "Flexible Multiport Multiformat Burst Buffer," and related to U.S. application Ser. No. 08/136,621, filed Oct. 13, 1993, now U.S. Pat. No. 5,463,422, entitled "Data Processing Technique for Limiting the Bandwidth of Data to be Stored in a Buffer," both applications being assigned to the present assignee and incorporated herein by reference.

FIELD OF THE INVENTION

This invention relates to video processing techniques and, in particular, to an improved technique for transferring video data from a video memory to a separate storage medium, such as a hard disk, in a computer.

BACKGROUND OF THE INVENTION

In a typical multi-media computer system, a conventional personal computer is augmented with a full-motion video card to display full-motion video images in a window on its display screen. The video information may be generated by any source. Still images, such as text, may be concurrently displayed outside the video window. Such a system offers enormous potential for educational applications and other interactive applications.

The full-motion video data may be recorded on a hard disk or other storage medium used by the computer for later playback and display. When attempting to store full-motion video data on a hard disk, a problem exists in that the bandwidth of the original full-motion video data is much greater than the bandwidth of the conventional hard drives used in personal computers. Further, the unpredictable track access times for recording on a hard disk cause the short-term bandwidth of the hard drive to be unpredictable. Accordingly, the complete original video data cannot typically be saved on a hard drive for later playback.

The system of FIG. 1 will be used to illustrate this problem and other problems with the existing art when attempting to store full-motion video data on a hard disk using a personal computer. The original full-motion video data may be in the form of a standard analog video signal such as in a National Television System Committee (NTSC) format or other format. Assuming the original video data is analog, this analog signal is then converted to a digital signal using an A/D converter 10. This digitized signal is then applied to an input of a full-motion video controller card 12 (which may or may not include the A/D converter 10). Such a video controller card 12 includes a full-motion video memory 14. One type of video controller card and video memory is described in U.S. application Ser. No. 08/136,621, previously mentioned.

The video controller card 12 is connected to a system bus 16. Also connected to bus 16 and to an input of video controller card 12 is a conventional VGA controller and frame buffer 20. The full-motion video data contained in the video memory 14 is multiplexed with the data stored in the VGA frame buffer 20, and this multiplexed data is applied to a monitor. The monitor then simultaneously displays a full-motion video window along with other data outside the window.

The personal computer's CPU 22 is connected to the system RAM 24 and the CPU 22 is connected to bus 16 for controlling, among other things, transfers between the system RAM 24 and the hard drive 26.

The conventional hard drive 26 is connected to bus 16 via a conventional buffer 28. A data transfer from RAM 24 to hard drive 26 is asynchronous with the operation of the video controller card 12. Data is transferred to hard drive 26 by transmitting bursts of data over bus 16, and buffer 28 is used to temporarily store this burst of data while the hard drive 26 records the data on a rotating disk, consuming an unpredictable amount of time. Buffer 28 may have a capacity on the order of 64 Kbytes.

FIG. 2 illustrates a conventional operation of the system of FIG. 1 when storing full-motion video data on the hard drive 26. The full-motion video data is conventionally transmitted as frames of data, where each frame stores all the pixel information needed to display a single image on a monitor having, for example, 640×480 pixels. A typical frame rate is 30 frames per second. When this pixel data is digitized, the rate of pixel data may be on the order of 20–30 Mbytes per second, depending upon the digitizer used.

In a conventional NTSC format, each frame is composed of two fields of interlaced lines of pixels, so that each field has a period of approximately 1/60th of a second. The fields may be referred to as even fields and odd fields since one field energizes even lines of pixels on the monitor and the other field energizes odd lines of pixels on the monitor. This assumes a raster-scan type monitor is used.

Due to the extremely large bandwidth of the incoming digital video data, the video data is selectively scaled down by circuitry on the video controller card 12 to reduce the bandwidth of the data to make this bandwidth compatible with the bandwidth of the video memory 14, the bus 16, and the hard drive 26. The bandwidth of the hard drive 26 may be on the order of 400–600 Kbytes per second, which is similar to the bandwidth of bus 16. Thus, the original video data must be scaled down considerably, both horizontally and vertically, to reduce its average bandwidth to 600 Kbytes per second or less.

FIG. 2 illustrates five time periods T1–T5 during which time full-motion video is being stored in the video memory 14 and subsequently transferred to the hard drive 26. A single port video memory 14 is presumed, although the problem being addressed would also arise if a dual-port VRAM were used as the video memory 14. Each time period T1T5 coincides with the transmission of an even or odd field of video data.

During time T1, an even field is transmitted, scaled down, and stored in the full-motion video memory 14 in FIG. 1.

At time T2, the even field video data already stored in the video memory 14 is transferred via bus 16 to the system RAM 24. This step is necessary since all data to be transferred to the hard drive 26 must be first stored in the system RAM 24 and processed by the CPU 22. During this time T2, the odd field of video data being transmitted by the video source is being dropped to free up the video memory 14 for the data transfer to RAM 24.

At time T3, a next even field of video data is stored in the video memory 14. During this time, the bus 16 is free, and the video data previously transferred to the system RAM 24 is now asynchronously transferred via bus 16 to the hard drive 26 for storing the even field received by the video memory 14 at time T1.

This process of storing and transferring is then repeated in an attempt to capture one field per frame of full-motion video data transmitted. During this time, the data stored in the video memory 14 may be displayed on a monitor without requiring the use of the bus 16.

Due to the inherent recording time unpredictability of hard drive 26, the required time to fully transfer a field of video data between the system RAM 24 and the hard drive 26 may exceed the allocated period T3. Such unpredictability stems from the varying track/sector access times for the hard drive 26 and the mechanical timing variances inherent in the hard drive 26.

Since the bus 16 is used to transfer data from the system RAM 24 to the hard drive 26 and to transfer data from the video memory 14 to the system RAM 24, the consecutive transfer steps shown at times T2 and T3 cannot overlap since they both require the use of bus 16. Thus, if the time for transfer of the data from the system RAM 24 to the hard drive 26 during period T3 is greater than 1/60th of a second or otherwise overlaps the time period T2 or T4, a complete frame of video data will be lost. Due to the unpredictability of the timing and bandwidth of the hard drive 26, unless large margins are provided between the memory transfer steps in time periods T2 and T3 (and subsequent periods) to account for worst case access times by the hard drive 26, frames of video data will be lost at random. Due to this random loss of frames, when this video data is later played back after capture on the hard drive 26, the displayed moving video image will be erratic and of limited value.

The prior art has attempted to avoid this random loss of frames by either greatly reducing the bandwidth of the video data (i.e., dropping large numbers of pixel bits) to reduce the time it takes to transfer one field of data over bus 16, or periodically deleting frames (e.g., delete every third frame) to reduce the frame rate and, hence, increase the time period allocated to transfer a field or frame of video data to the hard drive 26. Thus, the prior art systems are designed around the worst case bandwidth (i.e., minimum peak bandwidth) of the hard drive 26. Such prior art attempts to create reliable and predictable video storage and reproduction are at a great cost to the resolution and/or fluidity of the subsequently displayed video image.

What is needed is an improved video processing technique which does not require as great a reduction in bandwidth of the video signal or frame rate reduction as prior art techniques and which may be implemented with a minimum of additional hardware over that described with respect to FIG. 1.

SUMMARY

In a preferred embodiment, when full-motion video data is to be captured on a hard disk, a full-motion video memory on a video controller card has its addresses segmented into four groups, where each group can store one scaled-down or compressed frame (or field) of video data. The video memory is arranged to effectively act as a four-frame, first-in first-out (FIFO) buffer. The holding time of a single frame of data (i.e., four times the conventional holding time) in the video memory is sufficient to allow for the short-term unpredictable variations in the hard drive timing so that frames are not arbitrarily dropped by worst case timing/ accessing times of the hard drive.

The hard drive is given priority access to the system RAM so that the transfer of a field or frame to the hard drive can take place as soon as the hard drive is ready to accept more data. After the hard drive has captured a complete field or frame of data, the system RAM may then retrieve a next field or frame from the video memory without concern that fields or frames have been lost due to any recording delay by the hard drive.

Hence, the average bandwidth and timing of the hard drive, rather than the instantaneous worst case bandwidth and timing of the hard drive, is used when designing the system.

The total capacity of the video memory should be at least sufficient to store a complete frame of pixels if the highest resolution image is to be displayed in real time. When the video memory is switched from the display mode to the capture mode, each of the four address groups is thus sufficient to store ¼ of the original frame size. If the four-frame FIFO capability of the video memory is used, each frame of video data must be initially scaled down or compressed to ¼ size. This is usually satisfactory since the video image is typically displayed in a small window on the monitor along with other data and must be compressed anyway to store the data at a high frame rate on a conventional hard drive. Accordingly, implementation of this technique does not require a larger video memory than that already needed to provide a high quality displayed image.

In a preferred embodiment, video data may be read from and written into the same frame area in the video memory as long as the read (capture) and write (video-in) pointers have been determined to not overlap while accessing the same frame area. This more efficiently utilizes the capabilities of the hard drive.

Additionally, in the preferred embodiment, if the average bandwidth of the hard drive is not sufficient to capture all the frames of data being stored in the video memory, a time scaling feature is employed to selectively drop frames of data at periodic intervals to match the average frame capture rate to the rate at which frames are being stored in the video memory. Thus, the maximum capturable frame rate is realized given the particular hard drive used in the system. Such selective dropping of frames, rather than arbitrarily dropping frames, ensures a more fluid motion of the video image when displayed.

DETAILED DESCRIPTION OF THE PREFERRED EMBODIMENTS

Figure 3:
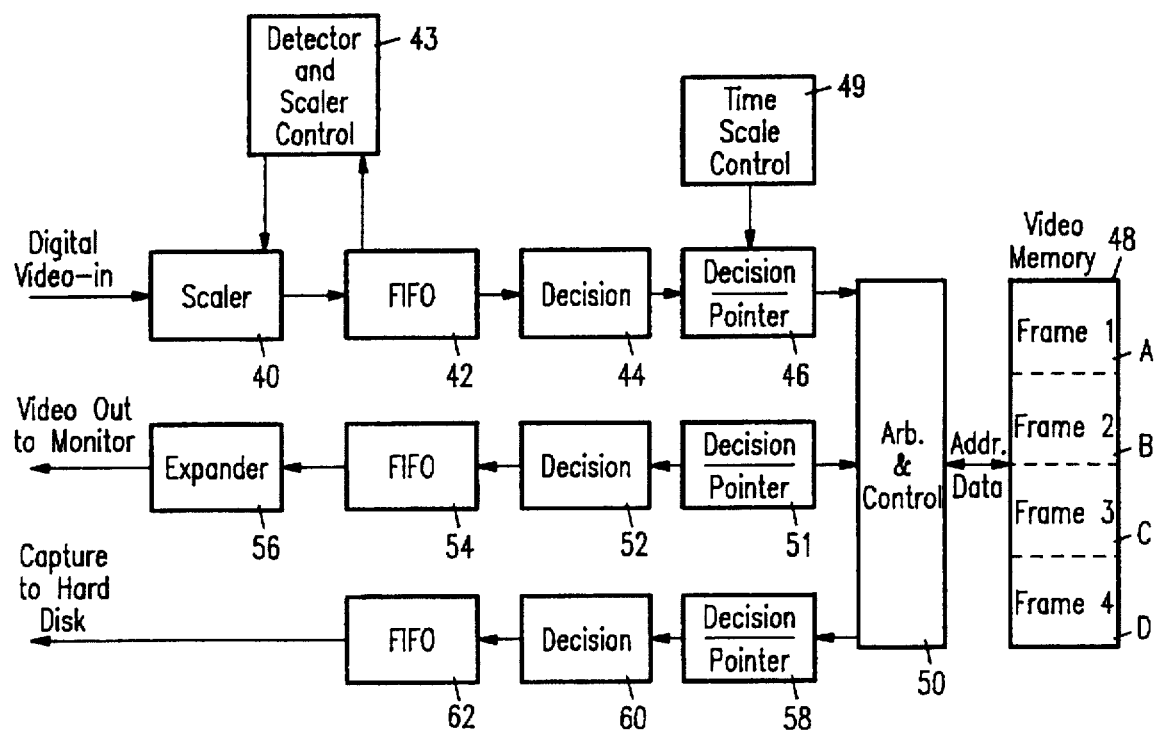
FIG. 3 is a block diagram illustrating one embodiment of the present invention incorporating a video memory storing a plurality of frames.

FIG. 3 is a block diagram illustrating the preferred embodiment video processing system. Each of the functional blocks of FIG. 3 is either a conventional circuit or a circuit/software program which could be implemented by one skilled in the art using conventional techniques after reading this disclosure.

Figure 1:
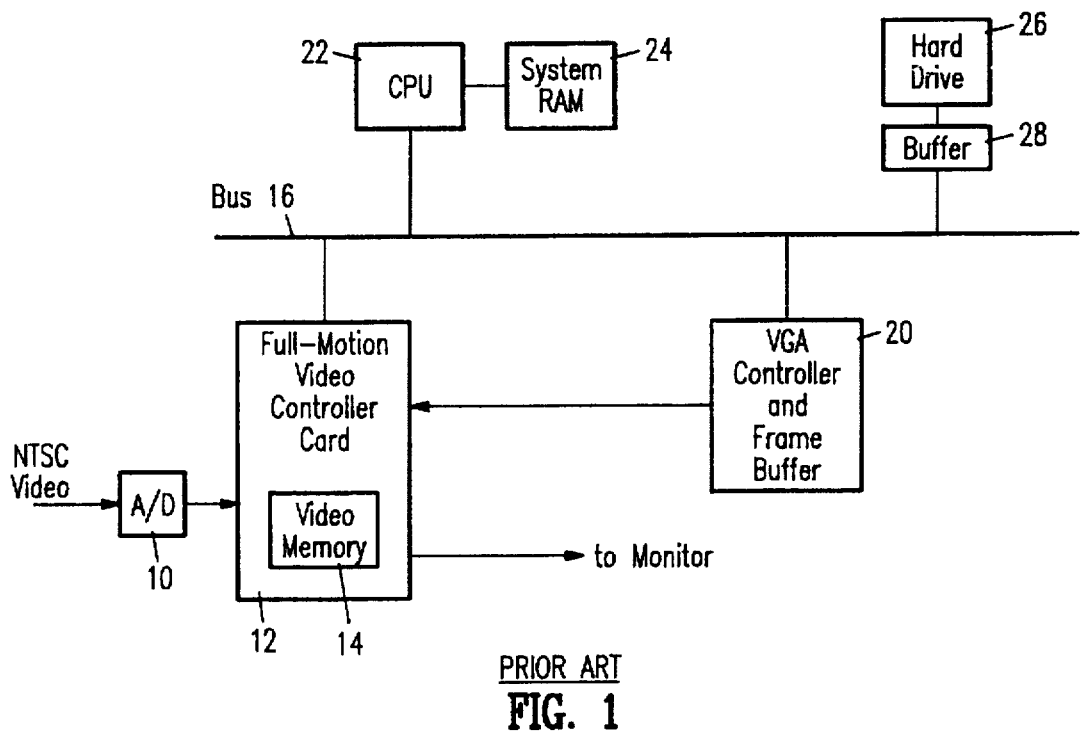
FIG. 1 is a block diagram of a conventional personal computer incorporating a full-motion video controller card to provide the personal computer with a multi-media capability.
Figure 2:
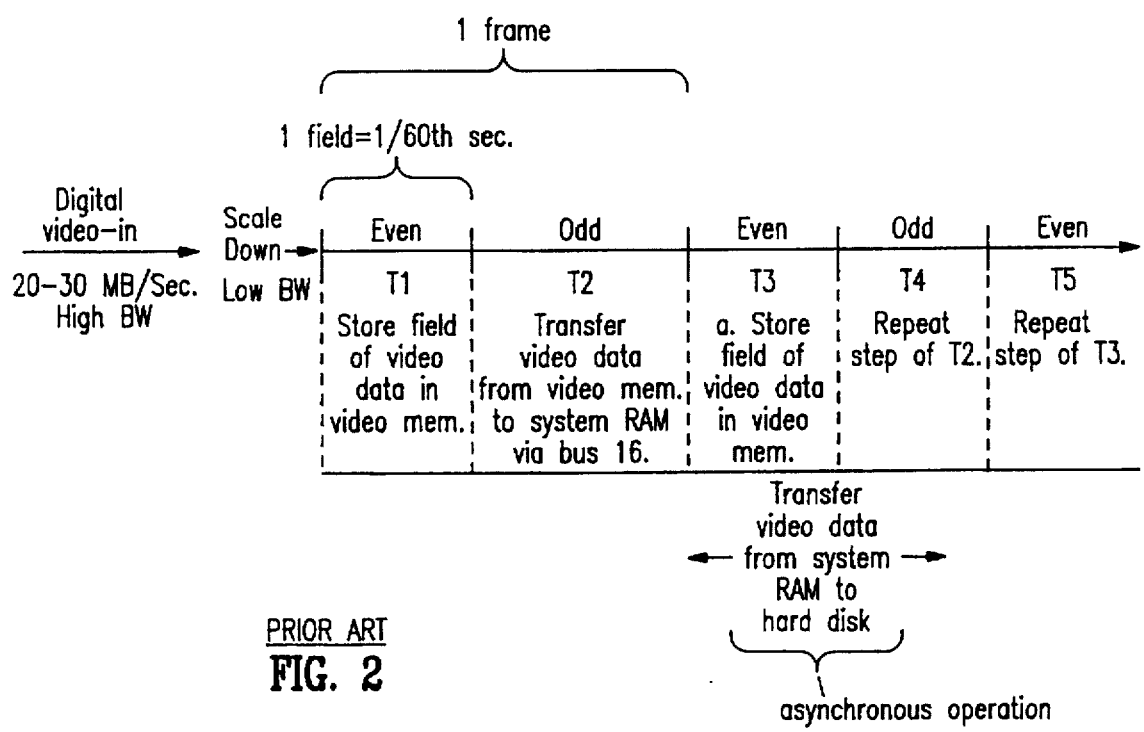
FIG. 2 is a time-line illustrating the operation of the structure of FIG. 1 when storing video data on a hard drive.

The structure of FIG. 3 is used in conjunction with a conventional personal computer (such as shown in FIG. 1) to process, buffer, capture, and display full-motion video data originating from a VCR, laser disc, CD ROM, television, or other video source. The structure of FIG. 3 is located on a video controller card and essentially replaces the video controller card 12 in FIG. 1. Since this disclosure focuses on the arrangement of the video memory and techniques for addressing the video memory, other aspects of a video controller card not pertinent to the invention will not be discussed in detail. Such detail may however be obtained from U.S. application Ser Nos. 08/127,219 and 08/136,621, previously mentioned.

The full bandwidth of digital video data originating from a video source is applied to a vertical and horizontal scaler 40. Scaler 40 may also be a compressor. This digital video-in data may be on the order of 20–30 Mbytes per second and carry pixel data for a pixel array of up to 1024×512 pixels (for high definition video) at 30 frames per second (or 60 fields per second). Scaler 40 may be controlled using well known means to effectively drop selected horizontal lines of pixels (such as every other line, etc.) to reduce the vertical height of the pixel image and hence reduce the average bandwidth of the video data. Scaler 40 may also be controlled to drop pixel data within the horizontal lines of pixels to reduce the horizontal width of the pixel image and to further reduce the bandwidth of the video data. Scaler 40 may also include an interpolator to regenerate pixel data rather than simply dropping data. Additionally, scaler 40 may also compress the pixel data to effectively reduce the amount of bits per frame without losing information. A compatible decompressor would then be used at the output of the display path to decompress the data before the data is displayed. Bits, lines, or fields of video data may be dropped by scaler 40 by forcing the output of scaler 40 to a specified level (e.g., zero) at the proper time. Timing of the scaler 40 may be obtained from the horizontal synchronization pulse, vertical synchronization pulse, and other clock information provided by the video source signal using well known techniques. In a preferred embodiment, filtering of the incoming pixel data is performed prior to scaling to controllably band limit the video image so that dropping pixel data has less of an impact on the video image when displayed.

If the highest quality image is to be displayed, no scaling will be performed by scaler 40, and the system will be required to process incoming video data at the highest bandwidth. (This assumes that no compression is used.)

The output of scaler 40 is applied to a first-in first-out (FIFO) buffer 42 for temporary storage. Well known packing and synchronization circuitry are used to interface the clocking of the scaled video data with the local clocking of the FIFO buffer 42. This FIFO buffer 42 and synchronization circuitry is described in detail in the copending U.S. application Ser. No. 08/127,219. In the preferred embodiment, this FIFO buffer 42 forms a portion of a cache memory.

An optional detector and scaler control circuit 43 detects an overflow of bits in FIFO buffer 42 and automatically controls scaler 40 to scale back the video data until the bandwidth of the video data outputted from scaler 40 matches the bandwidth of the video memory 48. Such a control circuit 43 is described in greater detail in application Ser. No. 08/136,621.

A decision circuit 44 determines the amount of space available in FIFO buffer 42 for receiving additional video data. The decision circuit 44 also requests access to the video memory 48, acting as a full-motion video buffer, to download data in the FIFO buffer 42 to prevent FIFO buffer 42 from overflowing.

A second decision circuit is included in the decision/pointer block 46. Block 46 also includes a video-in address pointer which provides an address for each of the pixel data bytes for storage into the video memory 48. The pixel data will be stored in sequential locations of the video memory 48. The address pointers identified in FIG. 3 will be discussed in greater detail later. The second decision circuit in block 46 detects whether the address indicated by the video-in pointer is within an address group A, B, C, or D which is already being accessed by another pointer. If so, the video-in pointer is denied access to that address group unless it is determined that the pointers will not overlap if the video-in pointer is granted access. This determination is described in greater detail later.

The decision/pointer circuit 46 also inserts a time stamp at the beginning of each frame of data to effectively identify the time separation between sequential frames written into the video memory 48.

A time scale control circuit 49 controls the decision/pointer block 46 to drop a field or frame in order to reduce the rate of frames being stored in video memory 48. Additional detail of this circuit will be provided later.

An arbitration and control circuit 50 determines whether a request for access by one of the decision circuits in blocks 46, 51, and 58, should be granted, depending on the availability of the video memory 48 and the priority assigned to each of the decision circuits. The decision circuits in blocks 46, 51, and 58 are assigned priorities 2, 1, and 3, respectively. Arbitration circuits are well known and will not be discussed in detail. Additional detail regarding a preferred arbitration circuit is discussed in the copending application Ser. No. 08/127,219.

As mentioned above, the video data for display or capture is initially stored in the video memory 48. To now access this video data for display on a monitor, a decision/pointer circuit 51 requests access to the video memory 48 when it has been determined by decision circuit 52 that FIFO buffer 54 must be refilled in order to maintain a flow of pixel data to the display. The operation of decision/pointer circuit 51 is similar to the operation of decision/pointer circuit 46. Once the request is granted, a burst of video data is outputted from the video memory 48 into FIFO buffer 54. The decision/pointer circuit 51 also includes a display pointer for sequentially addressing the pixel data stored in video memory 48 for immediate display. Such sequential address circuitry is conventional and will not be discussed in detail herein.

The decision/pointer circuit 51 may also provide a vertical zoom or expander capability by accessing the same line of pixels two or more consecutive times in order to increase the vertical height of the displayed image to be that selected by the user. The decision/pointer circuit 51 may also access the same field frame of data repeatedly to make up for fields/frames dropped during time scaling of the frame rate.

The video data in FIFO buffer 54 is outputted to a conventional unpacker and synchronization circuit for interfacing the local clocking of the FIFO buffer 54 with the display clock. The outputted pixel data is then applied to a horizontal expander 56. This expander 56 may also provide an interpolator function as well. The expander 56 inserts pixel data, which may be interpolated data or duplicates of pixel data, to increase the horizontal width of the pixel image. Control of this horizontal expander 56 is not relevant to this disclosure, but is described in detail in U.S. application Ser. No. 08/136,621.

Data is outputted from the expander 56 in accordance with a display clock and subsequently converted to an analog signal for presentation to a video monitor for display of the data. The timing of this video data applied to the monitor is described in greater detail-in U.S. application Ser. No. 08/136,621.

When it is desired to capture the video data stored in video memory 48 on a hard disk or other recording medium, a decision/pointer circuit 58 requests access to the video memory 48 and a capture pointer generates sequential address signals to access the video data to be captured. In the preferred embodiment, the request for access to the video memory 48 by the decision/pointer circuit 58 is given a priority 3 request since the downstream memory devices may be stalled without losing data.

Decision circuit 60 requests access to the video memory 48 when decision circuit 60 determines that FIFO buffer 62 is becoming empty.

A FIFO buffer 62 provides temporary storage of the data downloaded from the video memory 48. Data from FIFO buffer 62 is then applied to the system bus for storage in the system RAM.

As previously described, the unpredictable hard disk recording time due to sector seek and rotational delay inherently causes the time it takes to capture a full field of video data to be variable and unpredictable. In the conventional prior art, if the system RAM could not transfer an entire field or frame to the hard drive during the time allocated (e.g., 1/60th of a second), then a field or frame would be completely lost, resulting in a captured motion video image being of unpredictable quality. Additionally, in the conventional prior art, if priority were given to transferring all frames of data from the video memory to the system RAM, then the hard drive would be forced to wait until the transfer was complete before recording the data on its hard disk. Thus, the maximum throughput of the hard drive is not realized in the prior art. Using the prior art techniques, the captured motion video image may have an arbitrary number of consecutive frames deleted without-the user's knowledge, causing the resulting displayed image to move in a jerky fashion. It is undesirable to capture only a portion of a frame since this would result in portions of two frames being simultaneously displayed.

The present invention enables reliable capturing of the video data on a hard drive or other recording medium to achieve a predictable video quality when played back, without setting the parameters of the system to accommodate the worst case bandwidth and recording times of the recording medium. Using the present invention, the hard drive is allowed to run at its full throughput, since the hard drive does not have to wait for any video memory to system RAM transfers to be completed before recording a frame on its disk.

In one embodiment of the present invention, the video memory 48, which may be a VRAM, a DRAM, or the equivalent, is effectively transformed into a 4-frame FIFO buffer when the system is set to capture video data on a hard drive or equivalent recording medium.

Figure 4:
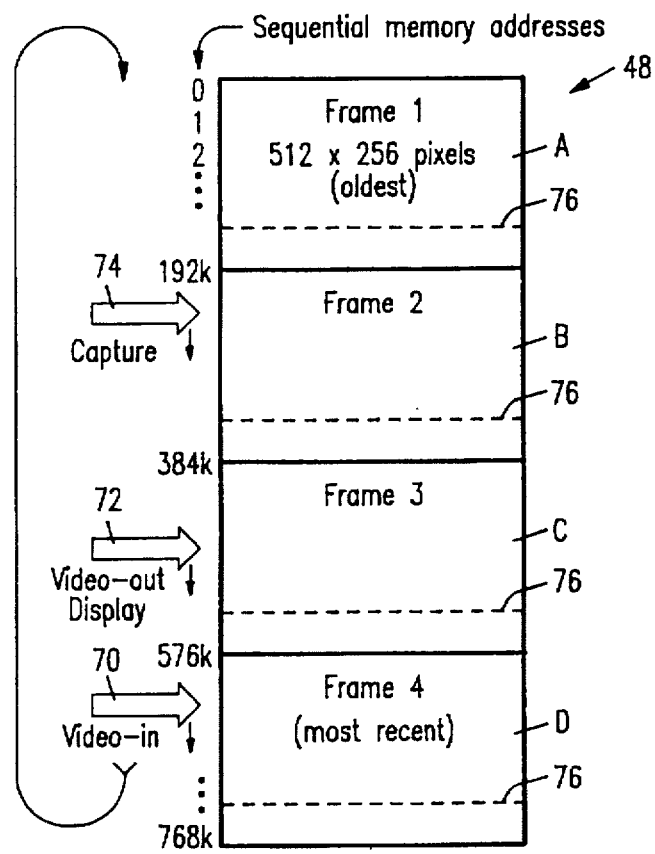
FIG. 4 is a conceptual view of the video memory of FIG. 3 and the pointers used to access storage locations within the memory.

The video memory 48 in FIG. 3 and the pointers in blocks 46, 51, and 58 are shown in greater detail in FIG. 4.

The preferred embodiment video memory 48 has a capacity for storing pixel data for a 1024×512 pixel array on a high resolution monitor screen. Accordingly, for the highest quality displayed image, all pixel data transmitted in a frame is temporarily stored in the video memory 48 for subsequent display at 30 frames per second. When the user desires to capture the highest quality image which can be captured by the relatively low bandwidth hard drive, the original video data must be compressed or, alternatively, some of the resolution of the original image must be sacrificed. In the capture mode, the particular system embodiment of FIG. 3 is controlled to scale down the original image to ¼ its original size; using scaler 40, such that each frame (or field) now consists of pixel data for an array of 512×256 pixels. Such control of scaler 40 may be accomplished using conventional techniques. The reduction (or compression) of the amount of data per frame period to 512×256 pixels allows the video memory 48 to store four complete frames or fields of video data in four address groups A, B, C, and D. Any size video memory 48 can be used while using this technique and any number of address groups may be used, depending upon the requirements of the system and the application.

Referring to FIG. 4, the video-in address pointer 70 (which may be a counter) in decision/pointer block 46 (FIG. 3) sequentially accesses storage locations in video memory 48 for storage of the incoming video data. If one field per address group A–D were to be stored (instead of a frame), pointer 70 would sequentially access storage locations starting from the top of the video memory 48 in FIG. 4, representing memory address 0, down to the bottom of the video memory 48, representing a maximum memory address of, for example, 768K (assuming a 768Kbyte video memory 48). The pointer 70 then wraps around to the lowest memory address 0 at the top of the video memory 48. If one frame (two interlaced fields) per address group A–D were to be stored, pointer 70 would sequentially address all even pixel line addresses in a single address group A–D then go back and address all odd pixel line addresses in the same address group to store the two interlaced fields of a single frame.

Ideally, all the pointers in FIG. 4 are sequenced at the same average rate over a period of four frames to achieve the maximum efficiency of the system and the maximum capturing of the video data.

The video-in pointer 70 sequences at a rate required to store the sealed (or compressed) fields/frames in the video memory 48 at a frame rate controlled by the time-scale control 49. Access to video memory 48 is controlled by the arbitration and control circuitry 50, and the sequencing of the video-in pointer 70 is halted if the decision/pointer 46 is not granted access to the video memory 48. In the frozen state example of FIG. 4, it is assumed that the video-in pointer 70 has stored slightly more than three frames of pixel data in video memory 48.

Display pointer 72 provides sequential address signals for reading out sequential frames (or fields) of video data from the video memory 48 so that this data may be displayed on a monitor. Since the display path shown in FIG. 3 has a relatively high throughput, there is no difficulty encountered in outputting for display 512×256 pixels per display frame period from video memory 48.

The capture pointer 74 in FIG. 4 is located within decision/pointer block 58 in FIG. 3 and sequentially accesses video data in the video memory 48 for transfer to the computer's system RAM (such as RAM 24 in FIG. 1) via the system bus 16 (FIG. 1). The video data stored in the system RAM is then asynchronously transferred to the hard drive (such as hard drive 26 in FIG. 1) via the system bus 16, using conventional techniques. As previously described, when the bus 16 is being used to transfer the video data to the hard drive, video data in the video memory 48 cannot be transferred to the system RAM. This time that the bus 16 is being used to transfer a frame or field of data to the hard drive is unpredictable due to the unpredictable recording speed of the hard drive. Thus, the progression of the capture pointer 74 will be unpredictable since the bus 16 must first be freed up before the capture pointer 74 can resume sequencing.

The four address groups A–D in the video buffer 48 accommodate temporary and unpredictable delays in the capture pointer 74 sequencing through the address locations. For example, in FIG. 4, sequential frames 1, 2, and 3 have already been written into the video memory 48 in accordance with the progression of the video-in pointer 70. However, due to an unpredictable delay in the transfer of a previous frame from the system RAM to the hard drive, the system bus was not available to transfer a new frame to the system RAM until two frame periods (e.g., 2/30th of a second) later. Hence capture pointer 74 was stalled during this period that the system RAM could not store additional data. In the past, this unpredictable delay would have required the arbitrary dropping of one or more frames. In the technique illustrated in FIG. 4, however, since the video-in pointer 70 and capture pointer 74 are not accessing the same frame simultaneously, the delayed capture pointer 74 may access video data from the previously stored frame 2 while the video-in pointer 70 is storing video data for a new frame 4 into the video memory 48.

Similarly, the display pointer 72 may access any of the frames 1–4 as long as the display pointer 72 does not overtake the video-in pointer 70.

Since data to be transferred is bursted at high rates between the video memory 48 and the various FIFO buffers, each of pointers 70, 72, and 74 do not sequence at steady rates, and control circuitry must be used to ensure that the capture pointer 74 and display pointer 72 do not cross the video-in pointer 70. If such were the case, a portion of a displayed frame would be from a different period in time, creating an undesirable displayed image. To ensure this event does not happen, in one embodiment, the video-in pointer 70 is prevented from entering into an address group A–D during the time that the capture pointer 74 is accessing that same address group. The particular address group being accessed by a pointer is known by detecting the two most significant bits (MSB) of the pointer address signals. If the two MSB's of the pointers 74 and 70 match, then both pointers require access to a same address group A–D. In a preferred embodiment, the video-in pointer 70 may enter the same address group A–D being accessed by the capture pointer 74 as long as the capture pointer 74 is beyond a critical address in that address group A–D. This critical address in each address group is illustrated by a dashed line 76. The critical address is set based upon which pointers are requesting access to the same address group. Using this technique, the video-in pointer 70 is prevented from crossing over the display pointer 72 or capture pointer 74 even though all pointers may be accessing a same address group. For example, if the capture pointer 74 is nearing the end of address group B, the video-in pointer 70 will be allowed to enter that same address group B since it is presumed that the capture pointer 74 will be reading the next address group C by the time the video-in pointer 70 reaches the bottom address in address group B. Similarly, if the video-in pointer 70 is writing a frame (interlaced even and odd fields) into address group B, the capture pointer 74 or display pointer 72 will not be allowed to enter address group B until it is detected that pointer 70 has gone beyond a predetermined odd pixel line address (a critical address). Accordingly, the critical address designated by line 76 is set at an address where there is a virtual certainty that pointer 70 will not overlap pointer 74 or 72.

Well known types of depth counters are used to detect the position of a pointer within an address group. A depth counter, for example, may be initially loaded with a critical address and decremented one count for each clocking of the capture pointer 74 after pointer 74 has entered an address group. Prior to the video-in pointer 70 entering into that address group, the count in the depth counter is then detected to determine whether the capture pointer 74 has gone beyond the critical address before allowing the video-in pointer 70 to begin accessing storage locations within that address group. If the pointer 74 has not gone beyond the critical address, then the video-in pointer 70 is blocked from accessing any addresses within that address group since it is presumed that the video-in pointer 70 will overtake the capture pointer 74 and produce an undesirable video display.

Figure 5:
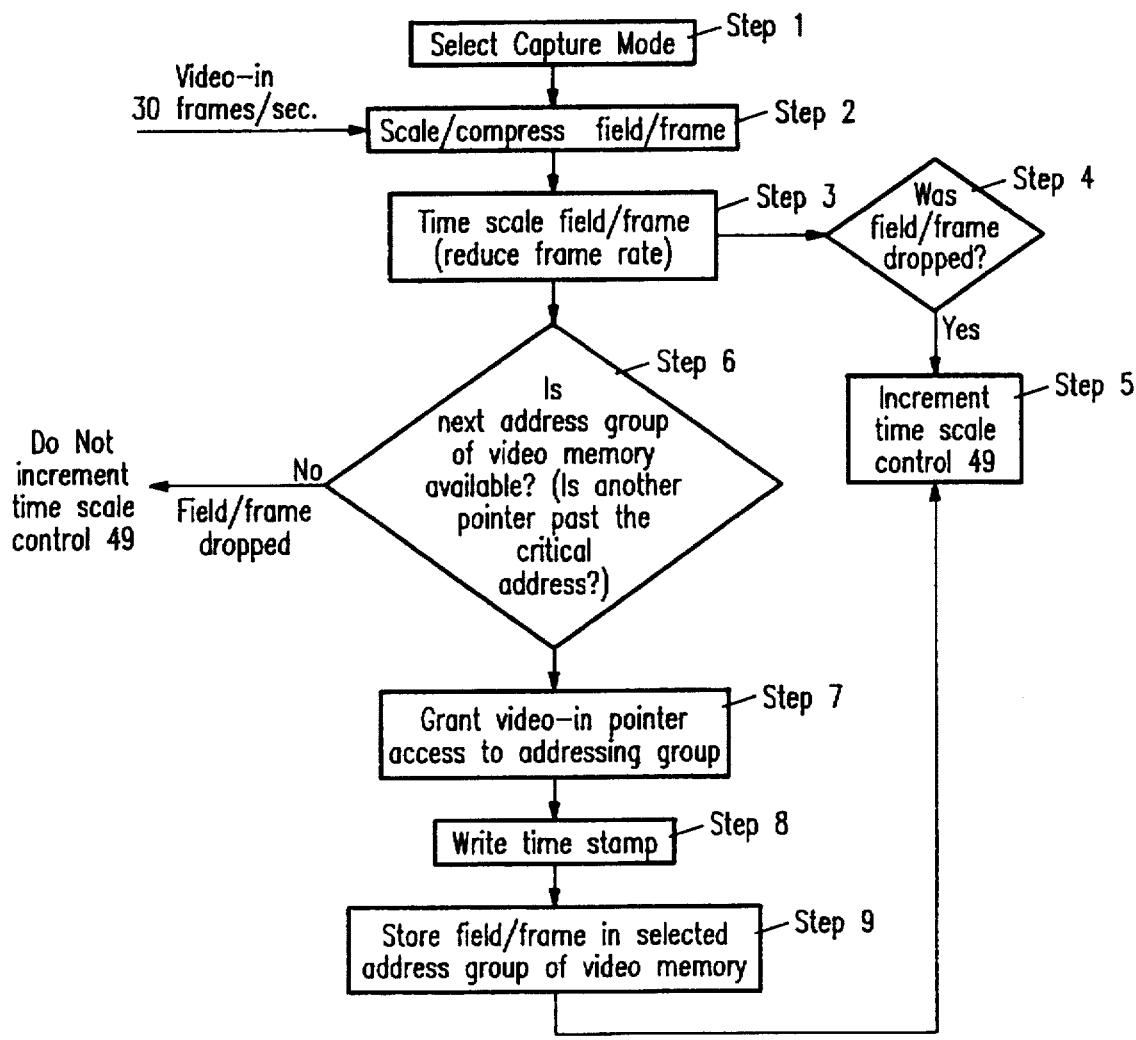
FIG. 5 is a flowchart illustrating a preferred method of operation of the video-in data path in FIGS. 3 and 4.
Figure 6:
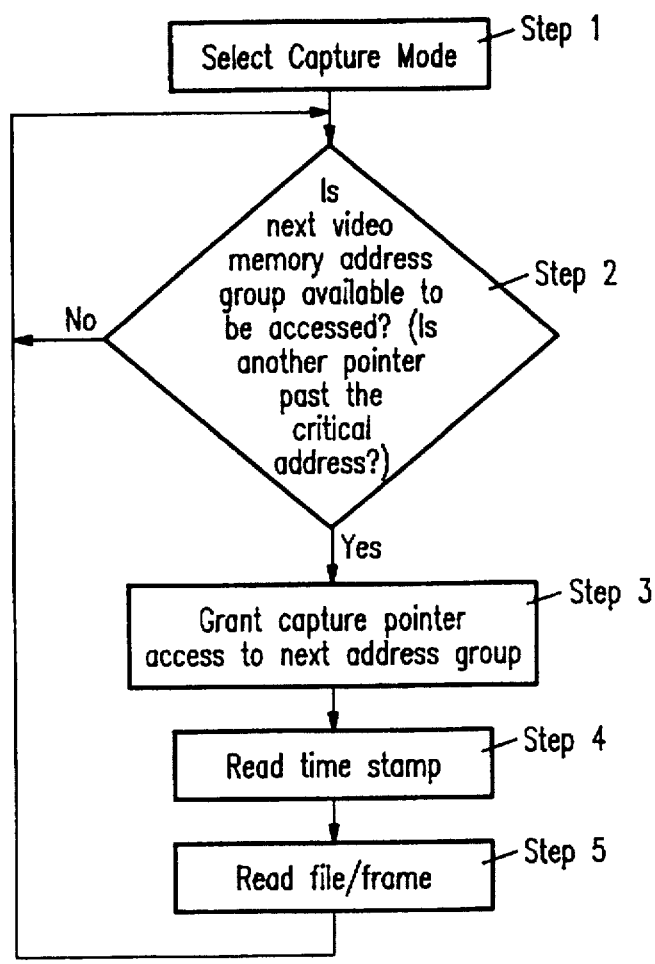
FIG. 6 is a flowchart illustrating the preferred method of operation of the capture data path in FIGS. 3 and 4.
Figure 7:
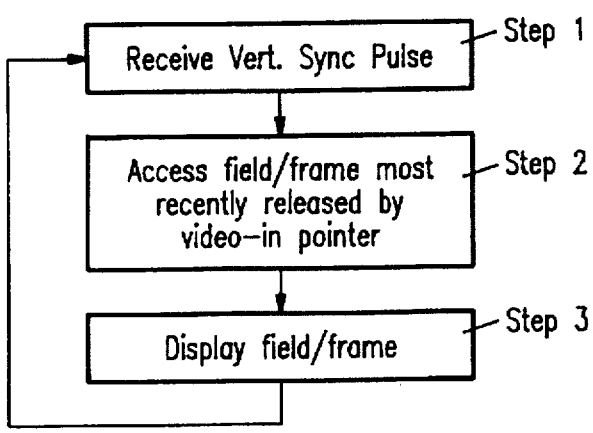
FIG. 7 is a flowchart illustrating the preferred method of operation of the display data path in FIGS. 3 and 4.

One example of the operation of the preferred video processing system is summarized in the flowcharts of FIGS. 5, 6, and 7.

If the system is in a display-only mode, the entire video memory 48 may be used to temporarily store a single frame or field of video data at a high bandwidth for providing a high resolution displayed image of, for example, 1024×512 pixels per frame at 30 frames per second. The flowcharts of FIGS. 5–7 are initiated upon a user selecting a capture mode of the video data in step 1 of FIG. 5.

In step 2, in order to accommodate the relatively low bandwidth and timing variations in the hard drive, the scaler 40 in FIG. 3 is controlled to reduce or compress the number of bytes per frame of incoming video data so that pixel data for a single frame may be stored in each of the four address groups A–D of the video memory 48 shown in FIG. 4. Assuming the original video data presented an image in the form of 1024×512 pixels, the scaler 40 would reduce this image to 512×256 pixels per frame.

In step 3, the decision/point circuit 46 is controlled by the time scale control 49 to reduce the frame rate to a predetermined amount, if necessary, to that required (e.g., from 30 frames/second to 27 frames/second) to avoid arbitrarily dropping frames due to throughput limitations of the system. This time scaling may be set by the user or performed automatically by the time scale control 49 detecting the unintentional dropping of frames and then incrementally lowering the frame rate until frames are not unintentionally dropped. This ensures that the displayed image will appear fluid.

The intentional dropping of a field or frame due to time scaling in step 3 increments the time scale control 49 (FIG. 3) by one unit in steps 4 and 5.

In step 6, the decision circuit in block 46 of FIG. 3, requests access, as appropriate, to the video memory 48 to store a field or frame data after determining that the particular address group A–D to be accessed is available. This requires a determination that any other pointer accessing the same address group has gone beyond the critical address 76 (FIG. 4). If access to the video-in pointer 70 is denied, then the field/frame must be dropped, and the time scale control 49 is not incremented (i.e., dropped frame does not affect control of frame rate).

In step 7, it is assumed that the video-in pointer 70 request for access has been granted by the arbitration and control circuitry 50.

In step 8, a time stamp is inserted by the decision/pointer circuit 46 into the video data stream at the beginning of each frame to identify the time separation between consecutive frames stored. A vertical synchronization pulse provided by the video source identifies the beginning of a new frame. This time stamp is generated by an 8-bit counter clocked in accordance with the vertical sync pulse. Thus, each captured frame has a header with an 8-bit time stamp.

When the captured frames are played back, the number of dropped frames between recorded frames may be detected by reading the time stamps, and these captured frames may be repeated as necessary (or interpolated frames may be inserted) to fill in the gap between the captured frames. This places the video image in synchronization with the captured sound track which has also been recorded on the hard disk using conventional techniques along with the video data. The sound track is separated out from the original analog video signal at the front end of the system using a well known demodulator circuit.

In step 9, the video-in pointer 70 is then sequentially incremented to store the time stamp and the frame data in the video memory 48.

Figure 8:
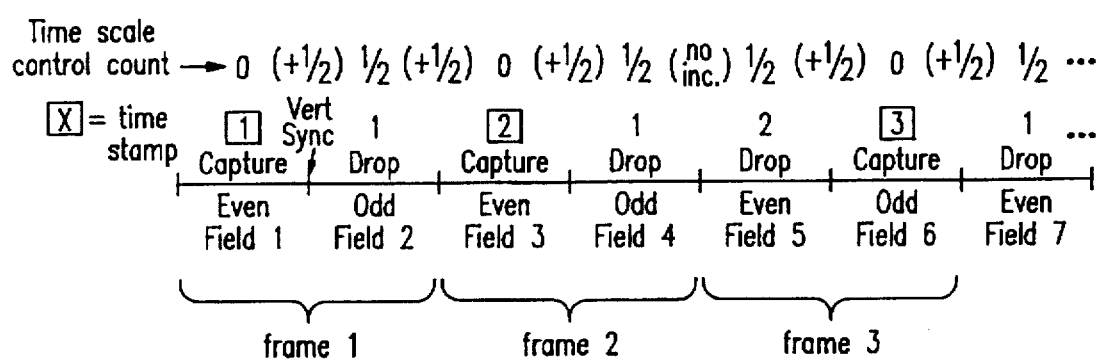
FIG. 8 is a time-line illustrating one example of the operation of the system of FIGS. 3 and 4.

After the successful recording of a frame or field of data in the video memory 48, the time scale control 49 (FIG. 3) is then incremented by one unit. The magnitude of this unit depends on the desired reduction of the original frame rate. The time scale control 49 controls the decision/pointer circuit 46 to store a frame or field each time the accumulated count in the time scale control 49 becomes effectively zero with a carry. This time scale and incrementing process is illustrated in FIG. 8 using a unit size of ½ to control the decision/pointer circuit 46 to store every other field. As seen in FIG. 8, the dropping of field 5 in step 3 of FIG. 5 causes the time scale control 49 to not be incremented. Thus, the next field (field 6) is stored and ultimately captured.

Reducing the frame rate prevents the video-in pointer 70 from getting too far ahead of the capture pointer 74. The reduction in the frame rate may be incrementally controlled or controlled by a user until no frames are unintentionally dropped.

Accordingly, the frame rate is controlled to allow the hard drive to capture as much video data as it is capable of capturing. The periodic deletion of frames at predetermined intervals will be less noticeable to the user than the sporadic dropping of frames.

FIG. 6 illustrates the operation of the capture pointer 74 and associated circuits. In step 1, the user selects the capture mode.

In step 2 of FIG. 6, the decision/pointer circuit-58 of FIG. 3 requests access to the next address group A–D for transferring a field or frame of data to the system RAM. The determination of whether another pointer is beyond the critical address is also made.

If a request for access is granted in step 3, the stored time stamp followed by a frame of data is then transferred in steps 4 and 5 from the video memory 28 to the system RAM. A hard drive then asynchronously records the data stored in the system RAM at the maximum throughput of the hard drive until the frame has been completely transferred.

FIG. 7 briefly illustrates the operation of the display pointer 72 and related circuits.

In step 1 of FIG. 7, a vertical sync pulse derived from the video source is detected. In response to this sync pulse, the decision/pointer circuit 51 requests access to the frame stored in video memory 48 which has been most recently released by the video-in pointer 70. The determination of whether another pointer accessing the same address group A–D is beyond the critical address is also made.

By accessing the most recently released frame rather than automatically accessing the stored frames sequentially, stored frames may be desirably jumped so that the display pointer 72 does not lag too far behind the video-in pointer 70 even if the display clock is slow.

FIG. 8 helps to additionally describe certain benefits of the inventive process. FIG. 8 illustrates the fields that have been captured on the hard drive. The time stamps (numbers within squares) associated with the captured fields are placed in a header at the beginning of each field of video data captured. The time stamp is determined by how many fields were transmitted since the previous stored field. The absolute field number is determined by accumulating the time stamps.

Ideally, the odd fields of a frame are intentionally dropped to maintain the full 30 frame per second rate and to provide a time window for the data stored in the video memory 48 to be transferred to the system RAM for capture. As seen by FIG. 8, the hard disk did not capture field 5 due to the system blocking the video-in pointer 70 access to the video memory 48 in step 6 of FIG. 5 when this field 5 was to be stored in the video memory 48. However, once the capture pointer 74 had progressed to the next addressing group for accessing a next field for capture, the video-in pointer 70 was able to then gain access to the addressing group that the capture pointer 74 had just exited. Thus, the next field of video data (field 6) was written into the addressing group for later capture by the hard disk.

As seen by FIG. 8, although the even field 5 was dropped, this field 5 is essentially a duplicate of odd field 6 which was captured. Hence, no frames have been lost at this point.

The above discussion of FIG. 8 has assumed that one field of each frame is stored in one of the four addressing groups A–D in the video memory 48 shown in FIG. 4. In such a case, both the capture pointer 74 and the video-in pointer 70 are sequentially incremented to sequentially address the storage locations of the video memory 48. This mode of capture is referred to as the field mode. In a preferred embodiment, a second mode is offered to the user, called the frame mode. In the frame mode, two interlaced fields of video data are filtered and scaled so as to be stored in one of the address groups A–D within the video memory 48 shown in FIG. 4. This frame mode offers a higher resolution image. In the frame mode, the even lines followed by the odd lines of the pixel data must be stored in a single address group to create a single frame.

A drawback of the frame mode is that if a frame is dropped, there is no way to recapture it, in contrast to the example of FIG. 8 where, in the field mode, an even field may be drop and the subsequently captured odd field effectively replaces the dropped even field.

An important advantage of this invention, besides enabling the maximum amount of video data to be captured given a hard drive's capability, is that the data which is captured is also that data seen on the display.

If enhanced resolution were desired, an increased video memory 48 size may be used so that less scaling by scaler 40 would be necessary in order to fit a field or a frame size into each addressing group A–D of the video memory 48. If capturing video data at a higher frame rate and higher resolution were required, additional address groups would be provided in the video memory 48.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method for storing and retrieving video data from a video memory, the method comprising:

dividing the video memory into a first address group, configured to store a first frame of the video data, and a second address group, configured to store a second frame of the video data;

selecting, using a video-in pointer, a first address in the first address group, the video-in pointer addressing the video memory for storage of the video data into the video memory;

selecting, using a video-out pointer, a second address in the second address group, the video-out pointer addressing video data in the second address group for displaying the video data;

determining whether the video-out pointer is beyond a first critical address in the second address group, the first critical address being an address, other than a last address in said second address group, selected to ensure that the video-in pointer may enter and address the second address group without overtaking the video-out pointer addressing video data in the second address group; and if the video-out pointer is not beyond the first critical address, preventing the video-in pointer from addressing video data in the second address group until the video-out pointer is beyond the first critical address.

2. The method of claim 1, further comprising:

determining whether the video-in pointer is beyond a second critical address in the first address group, the second critical address being an address, other than a last address in said first address group, selected to ensure that the video-out pointer may enter the first address group without overtaking the video-in pointer addressing video data in the first address group; and if the video-in pointer is not beyond the second critical address, preventing the video-out pointer from addressing video data in the first address group until the video-in pointer is beyond the second critical address.

3. The method of claim 2, wherein the first critical address is different from the second critical address.

4. The method of claim 2, wherein the step of preventing the video-out pointer from addressing video data in the first address group comprises the step of causing the video-out pointer to re-address the second address group to redisplay a frame of video data in the second address group.

5. The method of claim 1, wherein the step of preventing the video-in pointer from addressing video data in the second address group comprises the step of causing the video-in pointer to re-address the first address group to store a new frame of video data in the first address group.

6. The method of claim 1, wherein the step of preventing the video-in pointer from addressing video data in the second address group comprises the step of stalling the video-in pointer so as to drop a current frame of video data.

7. The method of claim 1, wherein the video memory has four address groups, each address group containing a frame of video data.

8. The method of claim 1, wherein the first frame and the second frame each comprise one field of video data.

9. A method for storing and retrieving video data from a video memory, the method comprising:

dividing the video memory into a first address group, configured to store a first frame of the video data, and a second address group, configured to store a second frame of the video data;

selecting, using a video-in pointer, a first address in the first address group, the video-in pointer addressing the video memory for storage of the video data into the video memory;

selecting, using a video-out pointer, a second address in the second address group, the video-out pointer addressing video data in the second address group for displaying the video data;

determining whether the video-in pointer is beyond a first critical address in the first address group, the first critical address being an address, other than a last address in said first address group, selected to ensure that the video-out pointer may enter and address the first address group without overtaking the video-in pointer addressing video data in said first address group; and if the video-in pointer is not beyond the first critical address, preventing the video-out pointer from addressing video data in the first address group until the video-in pointer is beyond the first critical address.

10. The method of claim 9, wherein the step of preventing the video-out pointer from addressing video data in the first address group comprises the step of causing the video-out pointer to re-address the second address group to redisplay a frame of video data in the second address group.

* * * * *